(12) United States Patent  
Yamaguchi et al.

(10) Patent No.: US 9,000,321 B2  
(45) Date of Patent: Apr. 7, 2015

(54) THERMAL CUTTER WITH SOUND ABSORBENT WALLS

(75) Inventors: Yoshihiro Yamaguchi, Kaga (JP); Satoshi Ohnishi, Komatsu (JP)

(73) Assignee: Komatsu Industries Corporation, Ishikawa (JP)

( * ) Notice: Subject to any disclaimer, the term of this patent is extended or adjusted under 35 U.S.C. 154(b) by 1731 days.

(21) Appl. No.: 12/142,954

(22) Filed: Jun. 20, 2008

(65) Prior Publication Data

US 2008/0314875 A1     Dec. 25, 2008

(30) Foreign Application Priority Data

Jun. 22, 2007   (JP) .................................. 2007-165542  
Jun. 2, 2008    (JP) .................................. 2008-144659

(51) Int. Cl.

| | |
|---|---|
| B23H 1/00 | (2006.01) |
| B23K 37/04 | (2006.01) |
| B23K 7/00 | (2006.01) |
| B23K 7/10 | (2006.01) |
| B23K 10/00 | (2006.01) |
| B23K 26/14 | (2014.01) |
| B23K 26/30 | (2014.01) |

(52) U.S. Cl.

CPC ............. *B23K 37/0461* (2013.01); *B23K 7/002* (2013.01); *B23K 7/10* (2013.01); *B23K 10/00* (2013.01); *B23K 26/1405* (2013.01); *B23K 26/422* (2013.01)

(58) Field of Classification Search

CPC ...... B23K 7/002; B23K 7/10; B23K 37/0461; B23K 26/1405; B23K 26/422; B23K 10/00; B23H 9/00

USPC ......... 219/68–69.2, 50–59.1, 121.78, 121.86, 219/121.36, 121.39, 121.48, 121.58, 121.6, 219/121.67; 83/167, 451; 126/622, 628, 126/629, 686; 266/48, 49, 50, 65; 372/107; 392/409; 454/7

See application file for complete search history.

(56) References Cited

U.S. PATENT DOCUMENTS

| | | | | |
|---|---|---|---|---|
| 2,512,706 | A | * | 6/1950 | Anderson ........................ 219/75 |
| 3,436,331 | A | * | 4/1969 | Dietz et al. ................ 204/224 M |
| 3,555,239 | A | * | 1/1971 | Kerth ........................ 219/124.34 |
| 3,787,247 | A | * | 1/1974 | Couch, Jr. ...................... 148/197 |
| 3,941,361 | A | * | 3/1976 | Cranston et al. ................ 269/15 |
| 3,944,203 | A | * | 3/1976 | Brekelbaum ................. 269/296 |
| 4,063,059 | A | * | 12/1977 | Brolund et al. ................. 219/68 |
| 4,097,713 | A | * | 6/1978 | Dunshee ................. 219/121.39 |
| 4,126,081 | A | * | 11/1978 | Zdeb ............................. 409/134 |
| 4,438,316 | A | * | 3/1984 | Ackermann et al. ..... 219/121.39 |

(Continued)

FOREIGN PATENT DOCUMENTS

| | | | |
|---|---|---|---|
| JP | 58103973 | A * | 6/1983 |
| JP | 07-136767 | A | 5/1995 |

(Continued)

*Primary Examiner* — Brett Spurlock  
(74) *Attorney, Agent, or Firm* — Global IP Counselors, LLP (57) ABSTRACT

A thermal cutter for cutting with heat a board mounted upon a table having an internal space includes a plurality of walls and a sound absorbent material. The walls are disposed in the internal space of the table to partition a plurality of exhaust chambers with each of the exhaust chambers having an aperture that opens towards a side on which the board is mounted. The sound absorbent material is provided to at least a portion of at least one of the walls, the sound absorbent material being removably coupled to the table.

20 Claims, 7 Drawing Sheets

(56) References Cited

U.S. PATENT DOCUMENTS

| | | | |
|---|---|---|---|
| 4,455,469 A * | 6/1984 | Inoue | 219/69.17 |
| 4,642,445 A * | 2/1987 | Stol | 219/121.84 |
| 4,712,288 A * | 12/1987 | Lodetti et al. | 29/557 |
| 4,792,657 A * | 12/1988 | Conley | 219/121.39 |
| 4,880,958 A * | 11/1989 | Conley | 219/121.58 |
| 5,532,440 A * | 7/1996 | Fujiwara | 181/289 |
| 5,734,143 A * | 3/1998 | Kawase et al. | 219/121.43 |
| 5,763,852 A * | 6/1998 | Brolund et al. | 219/121.44 |
| 6,114,652 A * | 9/2000 | Clarke et al. | 219/121.71 |
| 6,127,649 A * | 10/2000 | Toller et al. | 219/121.86 |
| 6,320,153 B1 * | 11/2001 | Hulings et al. | 219/121.39 |
| 6,387,320 B1 * | 5/2002 | Poulin et al. | 266/49 |
| 6,477,442 B1 * | 11/2002 | Valerino, Sr. | 700/213 |
| 6,664,495 B2 | 12/2003 | Yamaguchi et al. | |
| 6,834,429 B2 * | 12/2004 | Blair et al. | 29/847 |
| 6,974,197 B1 * | 12/2005 | Henry et al. | 312/1 |
| 6,987,241 B2 * | 1/2006 | Hacker et al. | 219/121.86 |
| 7,084,368 B2 * | 8/2006 | Yamaguchi et al. | 219/121.39 |
| 7,227,095 B2 * | 6/2007 | Roberts et al. | 219/69.11 |
| 7,497,980 B2 * | 3/2009 | Xu et al. | 264/219 |
| 8,168,915 B1 * | 5/2012 | Janecek | 219/121.39 |
| 2003/0080096 A1 * | 5/2003 | Yamaguchi et al. | 219/121.39 |
| 2003/0102293 A1 * | 6/2003 | Therond | 219/121.78 |
| 2004/0104203 A1 * | 6/2004 | Yamaguchi et al. | 219/121.36 |
| 2006/0225960 A1 * | 10/2006 | Ferlin et al. | 182/138 |
| 2007/0035777 A1 * | 2/2007 | Kintner | 358/3.29 |
| 2007/0084832 A1 * | 4/2007 | Wirth et al. | 219/69.12 |
| 2008/0029489 A1 * | 2/2008 | Ohnishi et al. | 219/68 |

FOREIGN PATENT DOCUMENTS

| | | |
|---|---|---|
| JP | 07-155991 A | 6/1995 |
| JP | 09-057438 A | 3/1997 |
| JP | 2000-024781 A | 1/2000 |
| JP | 2003-136248 A | 5/2003 |

* cited by examiner

THERMAL CUTTER WITH SOUND ABSORBENT WALLS

CROSS-REFERENCE TO RELATED APPLICATIONS

This application claims priority to Japanese Patent Application Nos. 2007-165542 and 2008-144659. The entire disclosure of Japanese Patent Application Nos. 2007-165542 and 2008-144659 are hereby incorporated herein by reference.

BACKGROUND OF THE INVENTION

1. Field of the Invention

The present invention relates to a thermal cutter for thermally cutting a board which is mounted upon a table, such as, for example, a plasma cutter, a laser cutter, a gas cutter, or the like.

2. Background Information

A table for a thermal cutter of this type is disclosed in Japanese Laid-Open Patent Publication No. 2003-136248, etc. Typically, a large number of planks (long and narrow boards) are arranged on edge upon the upper portion of a table for this kind of thermal cutter, with fixed intervals between them, so that the board which is to be cut can be conveniently mounted thereupon. With this type of thermal cutter, when performing thermal cutting, it is arranged to vent the fumes generated by thermal cutting by taking in intake air from the exterior into an exhaust chamber which is defined within the table, and by exhausting air from this exhaust chamber.

Furthermore, with such a thermal cutter, a technique is per se known (refer to Japanese Laid-Open Patent Publication No. Heisei 9-57438) of covering over the entire upper surface of the main table, in order to gather dust and other waste generated during the thermal cutting.

Still further, with such a thermal cutter, as a technique for alleviating the dust and noise generated during thermal cutting, a technique is per se known (refer to Japanese Laid-Open Patent Publication No. Heisei 7-136767) of fitting a hood which shields or absorbs noise from the plasma torch, Even further, a technique is per se known (refer to Japanese Laid-Open Patent Publication No. Heisei 7-155991) of providing a shiftable hood which is fitted with a sound insulation plate or sound absorbent material to a cutting reception stand which is used in the thermal cutting device, thus performing dust interception and sound insulation with this hood Yet further, with such a thermal cutting device, a technique has been disclosed (refer to Japanese Laid-Open Patent Publication No. 2000-24781) of covering a hood over a carrier which travels freely in the Y axis direction and upon which the torch head is provided, and also over the torch.

SUMMARY OF THE INVENTION

As described above, with a thermal cutting device, various techniques are per se known for mitigating fumes generated during thermal cutting, and for preventing noise.

However, with the technique disclosed in Japanese Laid-Open Patent Publication No. Heisei 9-57438, there is a problem with regard to the cost entailed, since it is necessary to cover over the entire upper surface of the main table. Furthermore, with the technique disclosed in Japanese Laid-Open Patent Publication No. Heisei 7-136767, since the hood is provided over the plasma torch itself, there is the problem that this technique cannot be applied to long term use, since, during the thermal cutting process, the hood experiences the influence of heat and the like.

Furthermore, with the technique disclosed in Japanese Laid-Open Patent Publication No. Heisei 7-155991, there is the problem that a substantial manufacturing cost is incurred, since it is necessary to provide a mechanism for shifting the hood itself. Moreover there is the problem that if, due to the influence of heat and so on generated during the thermal cutting, the hood should be damaged or the like, then a considerable amount of labor is required for exchanging it. Furthermore, with the technique disclosed in Japanese Laid-Open Patent Publication No. 2000-24781, there is a fear that the accuracy with which the carrier shifts may be reduced due to the carrier experiencing the influence of the fumes, since the carrier and the torch are housed under the hood. Moreover, there is also the problem that the labor required for maintenance of the carrier is increased, since it is housed under the hood.

The present invention has been conceived in the light of the problems described above, and it takes it as its object to provide a technique with which, along with it being possible to reduce the noise of the thermal cutter, it is also possible to perform maintenance thereof in a simple and easy manner. Furthermore, the present invention also takes it as its object to provide a technique with which, along with it being possible effectively to collect the fumes generated by the thermal cutter during thermal cutting, it is also possible to reduce the negative influences upon the thermal cutter due to these fumes. In order to solve the problems described above, the thermal cutter according to a first aspect of the present invention is a thermal cutter for cutting with heat a board mounted upon a table having an internal space. The thermal cutter includes a plurality of walls and a sound absorbent material. The walls are disposed in the internal space of the table to partition a plurality of exhaust chambers with each of the exhaust chambers having an aperture that opens towards a side on which the board is mounted. The sound absorbent material is provided to at least a portion of at least one of the walls, the sound absorbent material being removably coupled to the table.

According to this thermal cutter, along with it being possible to reduce the noise during thermal cutting due to the provision of this non-flammable sound absorbent material, when the sound absorbent material is damaged or fails, it can easily be removed from the table and exchanged.

In the thermal cutter described above, an air flow creating section may be provided that is configured and arranged to create an air flow within the exhaust chambers. The walls may include a front wall having an exhaust aperture and a side wall extending in a direction approximately orthogonal to the front wall with the air flow creating section being configured and arranged to create the air flow in a direction approximately parallel to the side wall towards the front wall. The sound absorbent material may be provided at least to the side wall. According to this thermal cutter, it is possible effectively to absorb sound which is transmitted in the direction orthogonal to the air flow.

In the thermal cutter described above, the entirety of at least a single wall of said walls may be made from a sound absorbent material. According to this thermal cutter, it is simple and easy to perform maintenance by exchanging this wall. Moreover, in the thermal cutter described above, said sound absorbent material may consist of a non-flammable or heat resistant material. According to this thermal cutter, it is possible to reduce the influence of the heat generated during thermal cutting.

Furthermore, in the thermal cutter described above, there may be further included: a cutting head for generating heat in the board; and a shield unit which shields said sound absorbent material, so that a heat releasing medium from said cutting head does not directly come into contact with the sound absorbent material. According to this thermal cutter, it is possible effectively to prevent damage to the sound absorbent material, since the heat releasing medium which performs the thermal cutting does not directly come into contact with the sound absorbent material.

Furthermore, in the thermal cutter described above, there may be further included: a cutting head configured and arranged to cut the board; a first axis shift unit supporting the cutting head to shift along a first axial direction parallel to a mounting surface of the table on which the board is mounted; a second axis shift unit configured and arranged to shift along a second axial direction orthogonal to the first axial direction and parallel to the mounting surface, the second axis shift unit having a arm extending along the first axial direction with the arm shiftably supporting the first axis shift unit along the arm, the cutting head being positioned on a predetermine side in the second axial direction with respect to the arm; and a cover unit coupled to the arm, the cover unit extending over approximately an entire surface region between the arm and the mounting surface over approximately an entire shiftable range of the cutting head along the arm during cutting on an opposite side from the cutting head in the second axial direction. According to this thermal cutter, it is possible appropriately to prevent the influence of sound which is being conducted in the direction of the arm from the cutting head, and of fumes.

Furthermore, in the thermal cutter described above, there may be further included: a cutting head configured and arranged to cut the board; a first axis shift unit supporting the cutting head to shift along a first axial direction parallel to a mounting surface of the table on which the board is mounted; a second axis shift unit supporting the first axis shift unit to shift along a second axial direction orthogonal to the first axial direction and parallel to the mounting surface, and a cover unit coupled to the second axis shift unit to face the mounting surface of the table, the cover unit covering over a space extending approximately over an entire shiftable range of the cutting head during cutting along the first axial direction from above and from four sides horizontally. The first axis shift unit may be disposed outside of the cover unit.

According to this thermal cutter, since the first axis shift unit is disposed externally to the cover unit, it is possible to prevent the first axis shift unit from experiencing any influence due to the fumes. Moreover, it is possible to perform maintenance upon the first axis shift unit in a simple and easy manner.

Furthermore, in the thermal cutter described above the exhaust chambers may be arranged along the second axial direction, and a length in the first axial direction of the cover unit may be greater than or equal to a length of the exhaust chambers in the first axial direction. With this thermal cutter it is possible for the cover unit to cover over the entirety of the exhaust chamber in the first axial direction. And, in the thermal cutter described above, the cover unit may be dimensioned to cover over approximately an entire upper portion of at least one of the exhaust chambers. According to this thermal cutter, it is possible to cover over approximately the entirety of the top of the single exhaust chamber, and also appropriately to reduce the escape of fumes or sound from the exhaust chamber.

Furthermore, in the thermal cutter described above, the cover unit may include a upper cover portion to cover over the space from above. The cutting head may be inserted into the space through the upper cover portion. The upper cover portion may include the first upper cover portion covering over from above a first portion of the space disposed on one side of the cutting head along the first axial direction, and the second upper cover portion covering over from above a second portion of the space disposed on the other side of the cutting head along the first axial direction. The first upper cover portion and the second upper cover portion may be configured and arranged to expand and contract as the cutting head shifts along the first axial direction. According to this thermal cutter, when the cutting head is shifting along the first axis, it is possible appropriately to cover over the upper portion of the space along the shiftable range of the cutting head.

Furthermore, in the thermal cutter described above, the second axis shift unit may include an arm portion extending along the first axial direction. The cover unit may include a plurality of upper cover portions covering over the space from above, a front surface cover unit covering the space from in front along the second axial direction, and a rear surface cover unit covering the space from behind along the second axial direction. The front surface cover unit and the rear surface cover unit may have lower edges disposed adjacent to or contacting a surface of the board when the board is mounted on the mounting surface. Each of the front surface cover unit and the rear surface cover unit may be suspended from the arm portion to swingably move in the second axial direction with respect to the arm portion with each of the front surface cover unit and the rear surface cover unit being configured and arranged to flex in the second axial direction. According to this thermal cutter, since both the front surface cover unit and also the rear surface cover unit are capable of themselves flexing, accordingly, even if the second axis shift unit changes its direction of shifting along the second axis direction, it is still possible to maintain the coverage of the space without exerting any hindrance to this shifting.

Further, the thermal cutter can further include: a cutting head configured and arranged to cut the board; a first axis shift unit supporting the cutting head to shift along a first axial direction parallel to a mounting surface of the table on which the board is mounted; a second axis shift unit supporting the first axis shift unit to shift along a second axial direction orthogonal to the first axial direction and parallel to the mounting surface; and a cover unit coupled to the second axis shift unit to face the mounting surface of the table, the cover unit covering over a space extending approximately over an entire shiftable range of the cutting head during cutting along the first axial direction at least from four sides horizontally. According to this thermal cutter, it is possible to appropriately suppress the influence of sound and fumes coming from the cutting head.

Further, at the thermal cutter, the cover unit includes a side cover unit provided enabling the space to be opened from one side. The thermal cutter can further include a drive mechanism for opening and closing the side cover unit.

With this thermal cutter, it is possible of the user to easily confirm the state of the content behind the cover unit. The thermal cutter can also include a control unit configured to control the drive mechanism to close the side cover unit during execution of thermal cutting by the cutting head, and to open the side cover unit while thermal cutting by the cutting head is stopped.

According to the thermal cutter, it is possible to suppress the influence of sound and fumes coming from the cutting head during confirmation of the state of the content of the cover unit.

Moreover, in order to solve the problems described above, the thermal cutter according to a second aspect of the present invention is a thermal cutter for cutting with heat a board mounted upon a table having an internal space including a cutting head, a first axis shift unit, a second axis shift unit and a cover unit. The cutting head is configured and arranged to cut the board. The first axis shift unit supports the cutting head to shift along a first axial direction parallel to a mounting surface of the table on which the board is mounted. The second axis shift unit supports the first axis shift unit to shift along a second axial direction orthogonal to the first axial direction and parallel to the mounting surface. The cover unit is coupled to the second axis shift unit to face the mounting surface of the table, the cover unit covering over a space extending approximately over an entire shiftable range of the cutting head during cutting along the first axial direction at least from four sides horizontally.

According to this thermal cutter, it is possible to appropriately suppress the influence of sound and fumes coming from the cutting head.

Further, with this thermal cutter, it is possible for the cover unit to cover the space from above and from the four sides horizontally. According to this thermal cutter, it is possible to appropriately further suppress the influence of sound and fumes coming from the cutting head.

Moreover, with this thermal cutter, the first axis shift unit may be arranged outside of the cover unit.

According to this thermal cutter, since the first axis shift unit is disposed externally to the cover unit, accordingly it is possible to prevent this first axis shift unit from experiencing any influence due to the fumes. Moreover, it is possible to perform maintenance of the first axis shift unit simply and easily.

Further, with the thermal cutter, the cover unit may include a side cover unit that covers the space from one side, the side cover unit being operatively coupled to a drive mechanism configured and arrange to open and close the side cover unit.

With this thermal cutter, it is possible for the user to easily confirm the state of the content of the cover unit.

The thermal cutter can also include a controller configured to control the drive mechanism to close the side cover unit during execution of thermal cutting by the cutting head, and to open the side cover unit while thermal cutting by the cutting head is stopped.

According to the thermal cutter, it is possible to suppress the influence of sound and fumes coming from the cutting head during confirmation of the state of the content of the cover unit.

BRIEF DESCRIPTION OF THE DRAWINGS

Referring now to the attached drawings which form a part of this original disclosure.

DETAILED DESCRIPTION OF THE PREFERRED EMBODIMENTS

Embodiments of the present invention will now be explained with reference to the drawings. It should be understood that the embodiments described below are not to be considered as being limitative in any way of the scope of the present invention, which is to be defined solely by the appended Claims; and the combination of all of the characteristics explained in the description of the embodiments is not to be considered as being essential to the implementation of the present invention.

According to the embodiments explained below, along with it being possible to reduce the noise due to the thermal cutter, it is also possible to perform maintenance simply and easily. Furthermore, according to the embodiments explained below, along with it being possible effectively to collect the fumes which are generated during thermal cutting with the cutter, it is also possible to reduce the negative influence exerted upon the thermal cutter due to the fumes.

Figure 1:
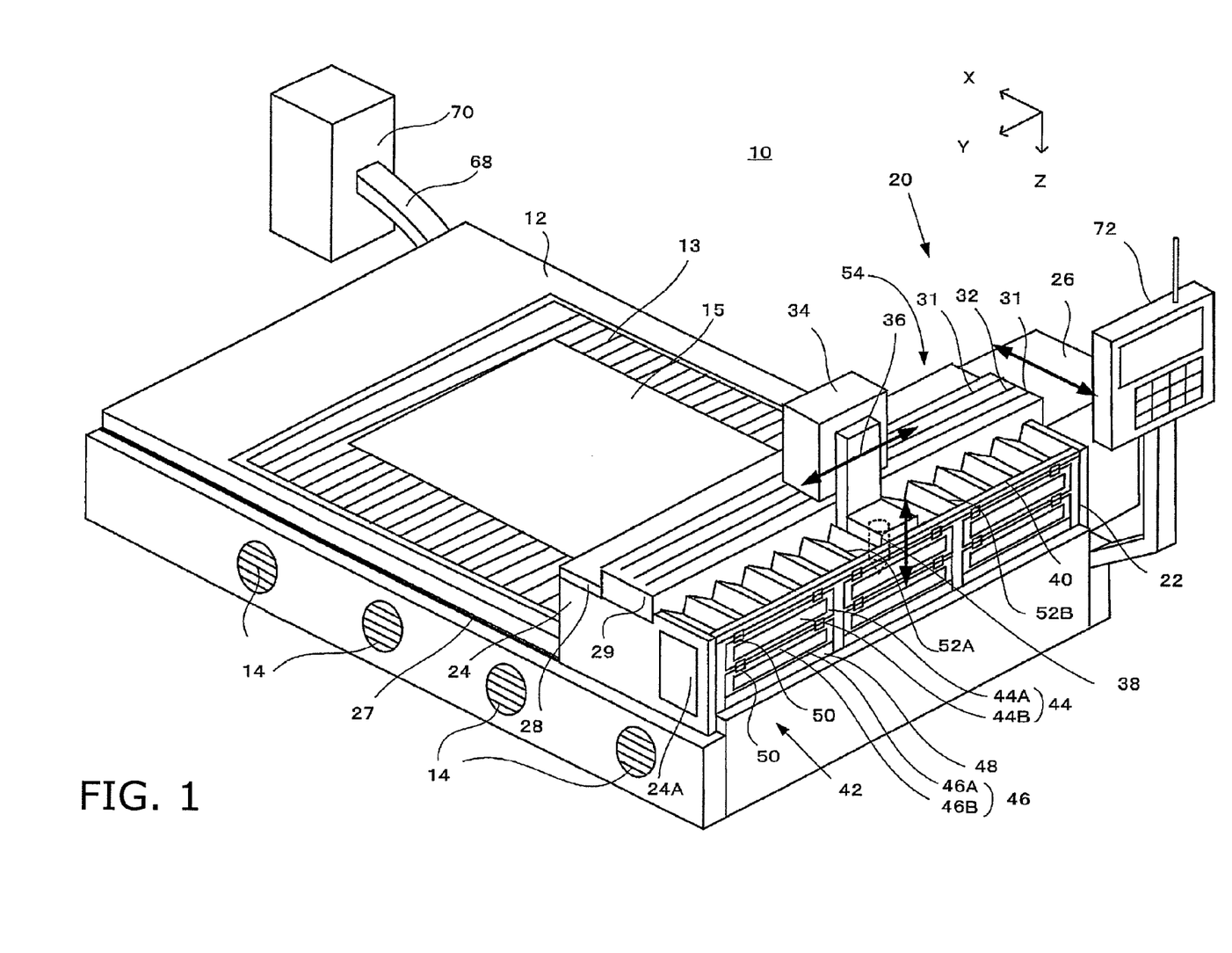
FIG. 1 is a perspective view showing the overall structure of a thermal cutter according to one embodiment of the present invention.
Figure 2:
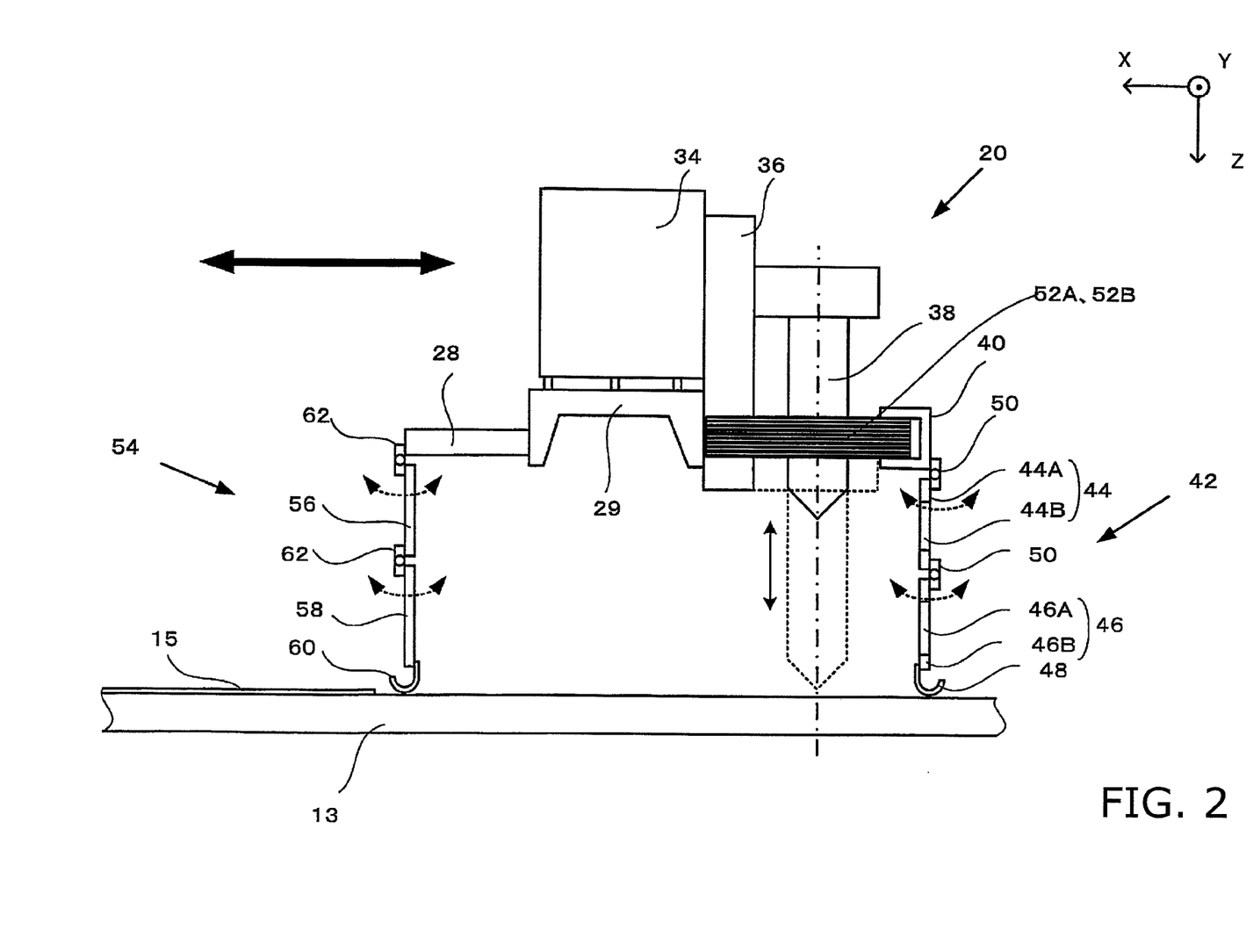
FIG. 2 is a sectional view of this thermal cutter according to an embodiment of the present invention.

FIG. 1 is a perspective view showing the overall structure of a thermal cutter according to one embodiment of the present invention, and FIG. 2 is a sectional view of this thermal cutter according to an embodiment of the present invention.

This thermal cutter 10 comprises a box shaped table 12 which is installed upon the flow. A rectangular shaped lattice pallet 13 can be installed upon the upper surface of the table 12. A board 15, which is the material to be cut, is mounted upon the lattice pallet 13. Accordingly, the upper planar surface of the lattice pallet 13 is the mounting surface for the board 15. The lattice pallet 13 is set into a plurality of apertures 16 (refer to FIG. 3) at an upper portion of the table 12, so that the lattice pallet 13 is freely fittable to and removable from the table 12.

A board whose planar size agrees with some specified standard size is generally widely used as the board 15. A board 15 which has such a standard planar size is referred to as a board of standard dimensions. The planar size of such a standard dimension board may be any of several sizes, for example 1.5 m×3 m or 2.4 m×6 m. The lattice pallet 13 is designed in the anticipation that a single standard dimension board of a single predetermined type will be mounted upon it. Accordingly, the planar size of the lattice pallet 13 is adapted to be suitable for the planar size of a single standard dimension board of this predetermined type.

An X-Y-Z orthogonal coordinate system is defined upon the thermal cutting device 10 for calculation of numerical values for controlling the position at which the board 15 will be cut. In this X-Y-Z orthogonal coordinate system, as shown in FIG. 1, the X axis (the "second axis") is taken along the longitudinal direction of the thermal cutting device 10 (i.e. along the direction which is parallel to the long side of the lattice pallet 13), the Y axis (the "first axis") is taken along the short direction of the thermal cutting device 10 (i.e. along the direction which is parallel to the short side of the lattice pallet 13), and the Z axis is taken along the direction which is oriented vertically downwards with respect to the lattice pallet 13 (i.e. along the direction oriented vertical downwards with respect to the board 15).

A pair of X axis rails 27 are provided upon the upper longitudinal side edges of the table 12, parallel to the X axis (only one of the X axis rails 27 is shown in FIG. 1). And an X axis shift trolley 20 is mounted upon these two X axis rails 27. Due to this arrangement, it is possible for the X axis shift trolley 20 to shift along the X axis over the X axis rails 27. The X axis shift trolley 20 comprises a trolley side wall portion 24 which rides upon one X axis rail 27 (the one shown in FIG. 1), another trolley side wall portion 22 which rides upon the other X axis rail (not shown in FIG. 1), a first arm 28 and a second arm 29 which are connected to the trolley side wall portion 22 and to the trolley side wall portion 24, and an X axis drive unit 26 which is one example of the "second axis shift unit" of this embodiment.

This X axis drive unit 26, for example, contains a servo motor, and shifts the X axis shift trolley 20 along the X axis by rotating a pinion gear, not shown in the figures, which is engaged to an X axis rack (also not shown) which is provided so as to extend along the X axis. Wiring and the like is mounted upon the first arm 28 for controlling gas supplied to a cutting head 38 and for performing other types of control. Two Y axis rails 31 and a Y axis rack 32 are provided to the second arm 29, all extending parallel to the Y axis. A Y axis shift trolley 34, which is one example of the "first shift unit" of this embodiment, is mounted upon the Y axis rails 31. By this structure, it is arranged for the Y axis shift trolley 34 to be capable of shifting along the Y axis over the Y axis rails 31. The Y axis rack 32 is meshed with a pinion gear, not shown in the figures, which is provided to the Y axis shift trolley 34. A servo motor not shown in the figures, for example, is housed within the Y axis shift trolley 34, and the abovementioned pinion gear is rotated by the drive force of this servo motor, thus shifting the Y axis shift trolley 34 along the Y axis rails 31.

According to this type of structure, when the X axis shift trolley is shifted along the X axis direction, the Y axis shift trolley 34 is also shifted along the X axis direction together therewith.

A carriage 36 is supported upon the Y axis shift trolley 34 (for example, it is mounted thereupon). And the cutting head 38 is supported upon this carriage 36. The carriage 36 can shift the cutting head 38 along the Z axis. The cutting head 38 is, for example, a plasma torch in the case of a plasma cutter, is a laser torch in the case of a laser cutter, is a gas burner in the case of a gas cutter, and may be a combination of any two of the above in the case of a compound type cutter. Here, the plasma arc, the laser, or the flame corresponds to the "heat releasing medium" of this embodiment. It should be understood that the cutting head 38 is controlled by a controller 72.

By the X axis shift trolley 20, the Y axis shift trolley 34, and the carriage 36 being controlled by the controller 72, it is possible to shift the cutting head 38 to any desired position over the lattice pallet 13, and to perform thermal cutting processing. The controller 72 controls the thermal cutter 10 according to operating commands issued by a human being, or according to a processing program.

The trolley side wall portion 24 has a window unit 24A on the end thereof in the negative X axis direction (i.e. on the right side in the drawing along the X axis; this will hereinafter be termed the "front surface side"). This window unit 24A is, for example, made with a transparent acrylic plate, and makes it possible to observe the state of cutting of the board 15 by the cutting head 38 from the side of the thermal cutter 10.

A connection member 40, which extends along the Y axis, is connected to the upper portions of the edges of the trolley side wall portion 22 and the trolley side wall portion 24 of the X axis shift trolley 20 on their front surface sides, i.e. to the edges thereof in the negative direction along the X axis. And a front surface cover unit 42 is connected to this connection member 40.

The front surface cover unit 42 (one example of a front cover portion) has a plurality of plate groups (for example three thereof), each consisting of an upper cover plate 44 (one example of a first cover plate), a lower cover plate 46 (one example of a second cover plate), and a lower edge plate portion 48 one exams(one example of a lower edge plate). These plate groups are arranged along the Y axis. Since the front surface cover unit 42 includes this plurality of plate groups in this manner, accordingly, for example, when performing maintenance of the cutting head 38, it is possible to perform such a task simply and easily by raising up any desired one of these plate groups.

The upper edge of each of the upper cover plates 44 is connected to the connection member 40 via two hinges 50 which can be folded around in the fore and aft directions along the X axis. Accordingly, the upper cover plates 44 can be swung to and fro along the X axis. Each of the upper cover plates 44 comprises a window frame unit 44A which is, for example, made from metal and a window unit 44B which is, for example, made from a transparent acrylic plate. Thus, through the window unit 44B, it is possible to observe the state of cutting of the board 15 by the cutting head 38.

In a similar manner, the upper edge of each of the lower cover plates 46 is connected to the lower edge of the corresponding one of the upper cover plates 44 via two hinges 50 which can be folded around in the fore and aft directions along the X axis. Accordingly, the lower cover plates 46 can be swung to and fro along the X axis. Each of the lower cover plates 46 comprises a window frame unit 46A which is, for example, made from metal and a window unit 46B which is, for example, made from a transparent acrylic plate. Thus, through the window unit 46B, it is possible to observe the state of cutting of the board 15 by the cutting head 38.

The upper edge of each of the lower edge plate portions 48 is connected to the lower edge of its corresponding lower cover plate 46. As for example shown in FIG. 2, these lower edge plate portions 48 are formed in letter-J shapes in cross section, and their curved surface portions face downwards, in other words towards the table 12. In this embodiment, the lower edge plate portions 48 are made from metallic plate. Since the lower edge plate portions 48 are made in letter-J shapes in this manner, accordingly it is possible for the lower edge plate portions 48 to be prevented from catching upon the board 15 when the X axis shift trolley 20 shifts along the X axis.

Since, in this embodiment, on the front surface cover unit 42, the connection spots by the hinges 50 between the connection member 40 and the upper cover plates 44, and the connection spots by the hinges 50 between the upper cover plates 44 and the lower cover plates 46, are (for each hanging chain of members) located at two locations whose heights are different, accordingly it is possible for each of the upper cover plates 44 and each of the lower cover plates 46 to be swung to and fro independently. Here, a construction in which, in this manner, the various swinging members of each hanging chain are sequentially connected together via the hinges 50 at a plurality of positions in the vertical direction which are different, will be termed a so called multiple hinge construction. Although, in this embodiment, two such swinging members along the vertical direction are provided in each hanging chain, and the number of spots at which these members are connected together by the hinges 50 are two in each case, it would also be acceptable, for example, to arrange for the number of cover plates in each hanging chain of the front surface cover unit 42 to be three or more, and to arrange to connect each of these cover plates to the member above it by hinges at three or more spots.

Since a multiple hinge construction is provided in this manner, when the front surface cover unit 42 is positioned over the board 15, even if the direction of shifting of the X axis shift trolley 20 reverses, this shifting of the X axis shift trolley 20 is not hindered by the upper cover plates 44 or the lower cover plates 46, and no damage is suffered by the upper cover plates 44 or the lower cover plates 46.

With this front surface cover unit 42, it is possible to cover over the front surface side of a space which extends over a predetermined range along the Y axis which includes a space extending over approximately the entire shiftable range of the head 38 along the Y axis when the cutting head 38 is performing thermal cutting (this will be termed the shiftable space during cutting), in other words which includes the space directly below the thermal cutting head 38. In this embodiment, the width along the Y axis direction of the front surface cover unit 42 is greater than or equal to the length of certain exhaust chambers 92 (to be described hereinafter) in the Y axis direction. Due to this, during thermal cutting by the thermal cutting head 38, it is possible effectively to prevent flowing out of the fumes from the front surface side of the apparatus.

As shown in FIG. 2, the connection member 40 is shaped approximately as a letter-C in cross section, and the one edges of extensible units 52A, 52B which can extend and retract are received in the interior thereof, so that it becomes possible to maintain the extensible unit 52A, which is one example of the "first upper cover portion" of this embodiment, and the extensible unit 52B, which is another example of the "second upper cover portion" of this embodiment, in predetermined positions in the vertical direction.

The extensible unit 52A is provided above one portion (a first portion) of the shiftable space during cutting on one side thereof (the left front side in the figure) and extends along the Y axis so as to face the carriage 36, and one end thereof along the Y axis is connected to the trolley side wall portion 24, while its other end is connected to one side of the carriage 36. This extensible unit 52A maybe made, for example, as a bellows type member, and is adapted to be able to change the range over which it covers (i.e. to extend and retract) in the direction along the Y axis, so that, even though the carriage 36 shifts along the Y axis, the extensible unit 52A continues to be able to cover over the portion of the shiftable space during cutting on one side of the carriage 36 along the Y axis. Similarly, the extensible unit 52B is provided above another portion (a second portion) of the shiftable space during cutting on the other side thereof (the right rear side in the figure) and extends along the Y axis so as to face the carriage 36, and one end thereof along the Y axis is connected to the trolley side wall portion 22, while its other end is connected to the other side of the carriage 36. This extensible unit 52B may also be made, for example, as a bellows type member, and is adapted to be able to extend and shrink the range over which it covers in the direction along the Y axis, so that, even though the carriage 36 shifts along the Y axis, the extensible unit 52B continues to be able to cover over the portion of the shiftable space during cutting on the other side of the carriage 36 along the Y axis. It should be understood that these extensible units 52A and 52B are not to be considered as being limited to being members made as bellows type members; for example, they could also be made with a telescopic structure (an interlocking and collapsible structure), so as to be able to extend and retract.

Furthermore, a rear surface cover unit 54 (one example of a rear cover portion) is also connected to the edge of the first arm portion 28 in the positive direction along the X axis (this is also termed its rear edge). As shown in FIG. 2, this rear surface cover unit 54 has a plurality of plate groups (for example, in this embodiment, three thereof), each consisting of an upper cover plate 56, a lower cover plate 58, and a lower edge plate portion 60. In this embodiment, the gap in the X axis direction between the front surface cover unit 42 and the rear surface cover unit 54 is wider than the width in the X axis direction of a single one of the exhaust chambers 92 which will be explained hereinafter. Moreover, the lengths in the Y axis direction of the front surface cover unit 42 and the rear surface cover unit 54 are greater than or equal to the length in die Y axis direction of one of the exhaust chambers 92. Due to this, according to the position of the X axis shift trolley 20, it is possible reliably to cover over the top of one of the exhaust chambers 92, so that it is possible effectively to reduce the escape of fumes and noise. It should be understood that it would also be acceptable, for example, for this length to be longer than the width in the X axis direction of two exhaust chambers. According to this structure, it is always possible to cover over the entirety of the upper side of the single exhaust chamber, so that it is possible effectively to reduce the escape of fumes and noise.

The upper edge of each of the upper cover plates 56 is connected to the arm 28 via two hinges 62 which can be folded around in the fore and aft directions along the X axis. Accordingly, the upper cover plates 56 can be swung to and fro along the X axis. Each of the upper cover plates 44 is made from, for example, metal.

In a similar manner, the upper edge of each of the lower cover plates 58 is connected to the lower edge of the corresponding one of the upper cover plates 56 via two hinges 62 which can be folded around in the fore and aft directions along the X axis. Accordingly, the lower cover plates 58 can be swung to and fro along the X axis. Each of the lower cover plates 58 is made from, for example, metal.

The upper edge of each of the lower edge plate portions 60 is connected to the lower edge of its corresponding lower cover plate 58. These lower edge plate portions 60 are, for example, formed in letter-J shapes in cross section, and their curved surface portions face downwards, in other words towards the table 12. In this embodiment, the lower edge plate portions 60 are made from metallic plate. Since the lower edge plate portions 60 are made in letter-J shapes in this manner, accordingly it is possible for the lower edge plate portions 60 to be prevented from catching upon the board 15 when the X axis shift trolley 20 shifts along the X axis.

Since, in this embodiment, on the rear surface cover unit 54, the connection spots by the hinges 62 between the first arm and the upper cover plates 56, and the connection spots by the hinges 62 between the upper cover plates 56 and the lower cover plates 58, are (for each hanging chain of members) located at two locations whose heights are different, accordingly it is possible for each of the upper cover plates 56 and each of the lower cover plates 58 to be swung to and fro independently; in other words, the cover unit 54 has a multiple hinge construction. Although, in this embodiment, two such swinging members along the vertical direction are provided in each hanging chain, and the number of spots at which these members are connected together by the hinges 62 are two in each case, it would also be acceptable, for example, to arrange for the number of cover plates in each hanging chain of the rear surface cover unit 54 to be three or more, and to arrange to connect each of these cover plates to the member above it by hinges 62 at three or more spots. Since, in this embodiment, the rear surface cover unit 54 is made in this manner with a multiple hinge construction, accordingly it is possible to swing each of the upper cover plates 56 and each of the lower cover plates 58 to and fro independently. Due to this, when the rear surface cover unit 54 is positioned over the board 15, even if the direction of shifting of the X axis shift trolley 20 reverses, this shifting of the X axis shift trolley 20 is not hindered by the upper cover plates 56 or the lower cover plates 58, and no damage is suffered by the upper cover plates 56 or the lower cover plates 58.

With this rear surface cover unit 54, it is possible to cover the rear side of the shiftable space during cutting with the cutting head 38. Due to this, during thermal cutting with the thermal cutting head 38, it is possible effectively to prevent any flowing out of fumes to the rear side.

It should be understood that it would also be acceptable to provide a sound absorbent material upon the cutting head 38 side of one or more of the upper cover plates 56, the lower cover plates 58, and the lower plate portions 60.

In this embodiment, the shiftable space during cutting by the cutting head 38 is covered over by the first arm portion 28, the second arm portion 29, and the extensible unit 52, its front surface side is covered over by the front surface cover unit 42, and its rear surface side is covered over by the rear surface cover unit 54, while its ends in two opposite directions are covered over by the trolley side walls 22 and 24. In other words, the shiftable space during cutting is covered over from above and from its four sides horizontally by these various members which face the mounting surface of the table 12. Due to this, during thermal cutting by the thermal cutter 38, it is possible to prevent the escape of sound from the shiftable space during cutting, and it is also possible appropriately to prevent the leakage of fumes therefrom. Here, the cover unit is principally constituted by the front surface cover unit 42, rear surface cover unit 54, extensible unit 52, the trolley side walls 22 and 24, the first arm portion 28, and the second arm portion 29.

A plurality of intake fans 14 are fitted to one wall 96 of the walls of the table 12 which extend along the X axis (the one on the front side in FIG. 1, hereinafter termed the "rear wall"), and these constitute one example of an air flow creating section for blowing air into the exhaust chambers 92 (refer to FIG. 3) of the table 12. The exhaust chambers 92 of the table 12 can be communicated with a dust collector 70 via a connection duct 68. During cutting of the board 15, this dust collector 70 collects fumes or the like within the exhaust chambers 92 of the table 12 by sucking in air from the exhaust chambers 92.

Figure 3:
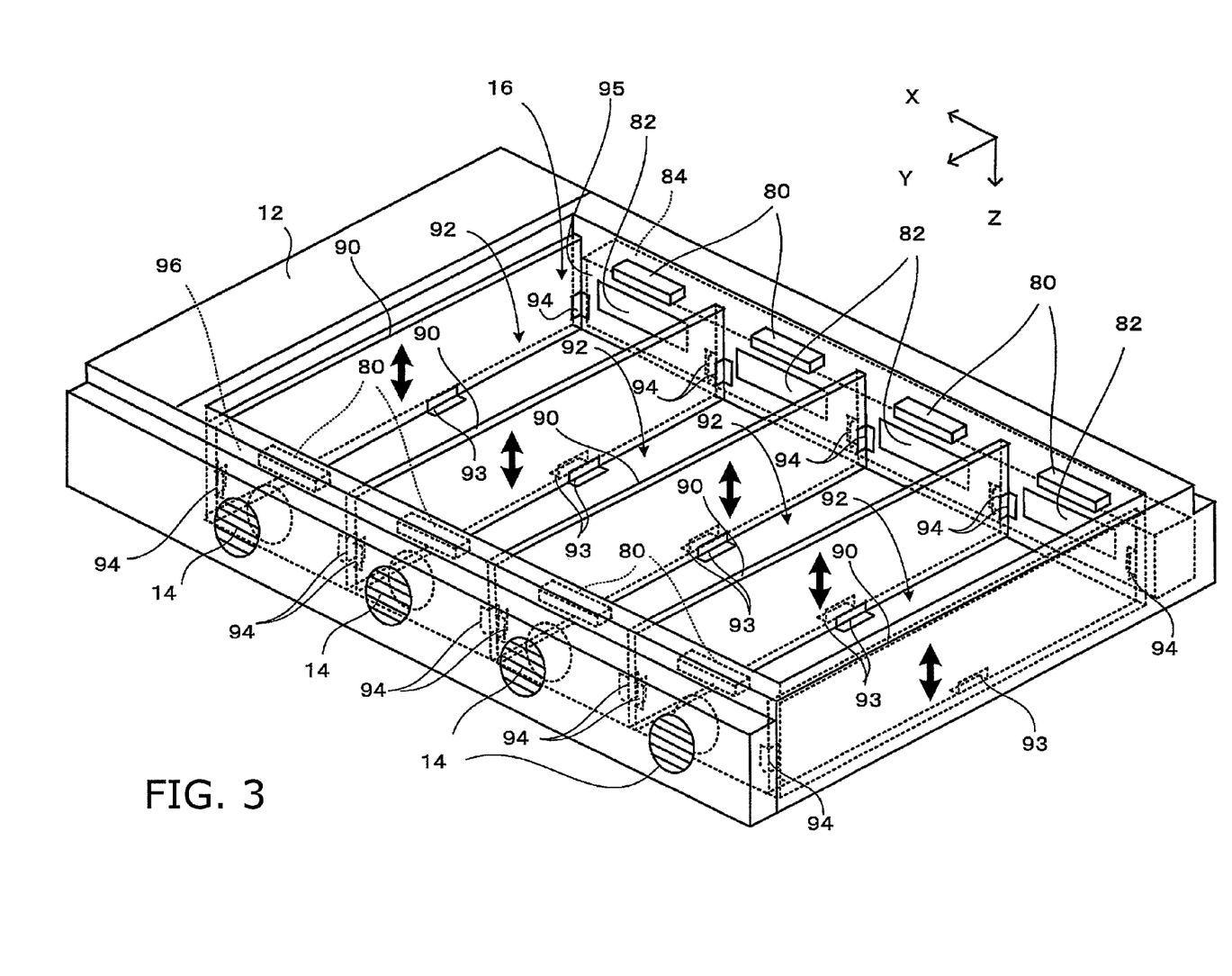
FIG. 3 is a perspective view showing the internal construction of a table according to this embodiment of the present invention.

FIG. 3 is a perspective view showing the internal construction of the table according to this embodiment of the present invention.

A plurality of apertures 16 are formed at the upper portion of the table 12 for the lattice pallet 13 to be set into from above. At a plurality of spots upon the upper portion of the outer circumferential wall around these apertures 16, there are provided a plurality of support blocks 80 for supporting the lattice pallet 13, when it has thus been set into the apertures 16.

A plurality of exhaust chambers 92 for exhausting fumes and the like generated during cutting of the board 15 are defined below the apertures 16. Each of these exhaust chambers 92 is defined by side walls 90, a front wall 95, and a rear wall 96, and opens above to one of the apertures 16.

The side walls 90 of the exhaust chambers 92 may be, for example, entirely made from a sound absorbent material which is also a non-flammable or heat resistant material (for example, a concrete type or ceramic type non-flammable inorganic material or the like), such as, for example, a foamed concrete board which has internal vacant spaces. Due to this, along with it being possible for these side walls 90 to absorb sound, it is also possible to divide up the exhaust chambers 92 in an appropriate manner. It should be understood that it would also be acceptable, as this sound absorbent material, to utilize, for example, a sheet member whose surface is shaped as concavo-convex (which also could include a metallic plate), since, as compared to a metallic plate whose surface is flat, it may be anticipated that such a member will be better at sound absorption and sound blocking. Moreover, it would also be acceptable to utilize concrete plate, gypsum plate, a porous cast metallic material, glass wool, rock wool, or steel wool as the sound absorbent material. Now, to consider the sound which is generated due to thermal cutting and enters into the exhaust chambers, it is considered that, due to being absorbed by the dust collector and so on, the sound, among the noise which has entered into the exhaust chambers, which passes through the exhaust apertures exerts comparatively little influence upon the total noise. On the other hand, since the sound which proceeds towards the side walls is reflected by the side walls and escapes to the exterior through the opening portions, or passes through the side walls and escapes to the exterior, or escapes to the exterior after having penetrated to the neighboring exhaust chamber, accordingly it is considered that the influence which it exerts upon the total noise is relatively large. Since the influence upon the total noise due to the side walls 90 of these exhaust chambers is comparatively large, and since the sound which proceeds towards the side walls can be effectively absorbed thereby, accordingly the advantageous effect of reduction of this noise is high. In this embodiment, the height of the exhaust chamber side walls 90 is such that, during cutting by the cutting head 38, they are not directly contacted by the arc, the flame of the burner, the light from the laser or the like.

Guide portions 93 which are provided on the bottom surface of the table 12 regulate the positions of the exhaust chamber side walls 90, and likewise guide portions 94 which are provided upon the side walls of the table 12 further regulate the positions of the exhaust chamber side walls 90. The exhaust chamber side walls 90 can be fitted to the table 12 or removed therefrom by being slid in or out along these guide portions 93 and 94. In other words, along with it being possible to install the side walls 90 of the exhaust chambers into their predetermined positions in the table 12 by sliding them in past the guide portions 93 and 94 from above, they can also be taken out from the table 12 upwards by reversing that procedure. Accordingly, if any of the exhaust chamber side walls 90 suffer any damage or fouling due to the influence of the thermal cutting, it is possible simply and easily to remove these exhaust chamber side walls 90 from the table 12, and to exchange them for new exhaust chamber side walls 90.

Each of the exhaust chambers 92 extends over a certain distance range from one end of the lattice pallet 13 in its short side direction (the Y axis direction) to its other end. The intake fans 14 are provided in the rear wall 96 of the exhaust chambers 92, and the exhaust apertures 82 are formed in its front wall 95. With this structure, the air which is blown by the intake fans 14 into the exhaust chambers 92 constitutes an air flow which proceeds to the exhaust apertures 82 approximately in parallel with the exhaust chamber side walls 90. It should be understood that it would also be acceptable to arrange to provide sound absorbent material upon at least one of the front wall 95 upon which the intake fans 14 are provided, and the rear wall 96 upon which the exhaust apertures are provided. An exhaust damper (not shown in the figure) is provided to each of the exhaust apertures 82. The exhaust apertures can be communicated with the exhaust duct 84 within the table 12. This exhaust duct 84 is connected to the intake aperture of the dust collector 30 via the connection duct 68. Thus, while cutting of the board 15 is being performed, according to the position of the cutting head 38, the exhaust apertures 82 which lead to those of the exhaust chambers 92 in which there is a possibility that fumes may be present are selectively opened and closed, so as to perform exhausting of these ones of the exhaust chambers 92.

Since, according to this thermal cutter 10 according to this embodiment, during thermal cutting, the sound which is generated at or transmitted to the lower side of the board 15 is absorbed by the side wall 90 of the exhaust chamber 92, accordingly it is possible effectively to reduce the noise during thermal cutting.

Furthermore, due to the provision of the front surface cover unit 44, the rear surface cover unit 54, the extensible unit 52, and so on, during thermal cutting, it is possible effectively to prevent sound which is generated at the upper side of the board 15 and sound which is conducted upwards from escaping to the exterior. Moreover, due to the provision of the front surface cover unit 44, the rear surface cover unit 54, the extensible unit 52, and so on, it is also possible effectively to prevent fumes generated during the thermal cutting from leaking to the exterior.

Next, a variant embodiment of the table 12 in this embodiment of the present invention will be described.

Figure 4A:
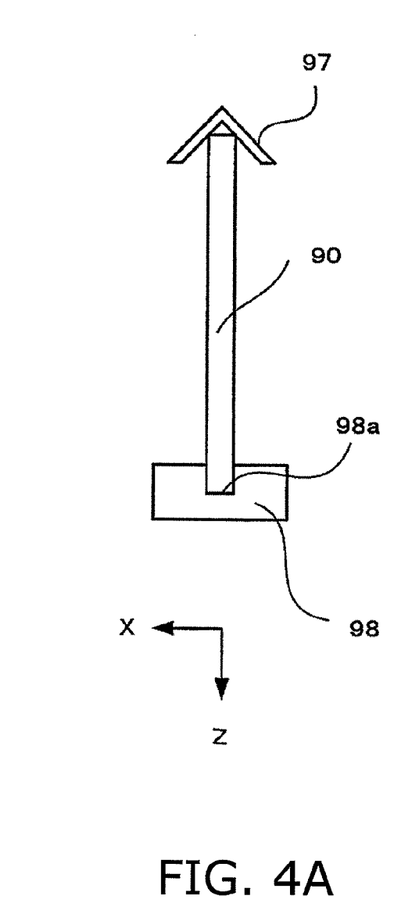
FIG. 4 is a figure showing the structure of one portion of the internal construction of a table according to a variant embodiment of the present invention.
Figure 4B:
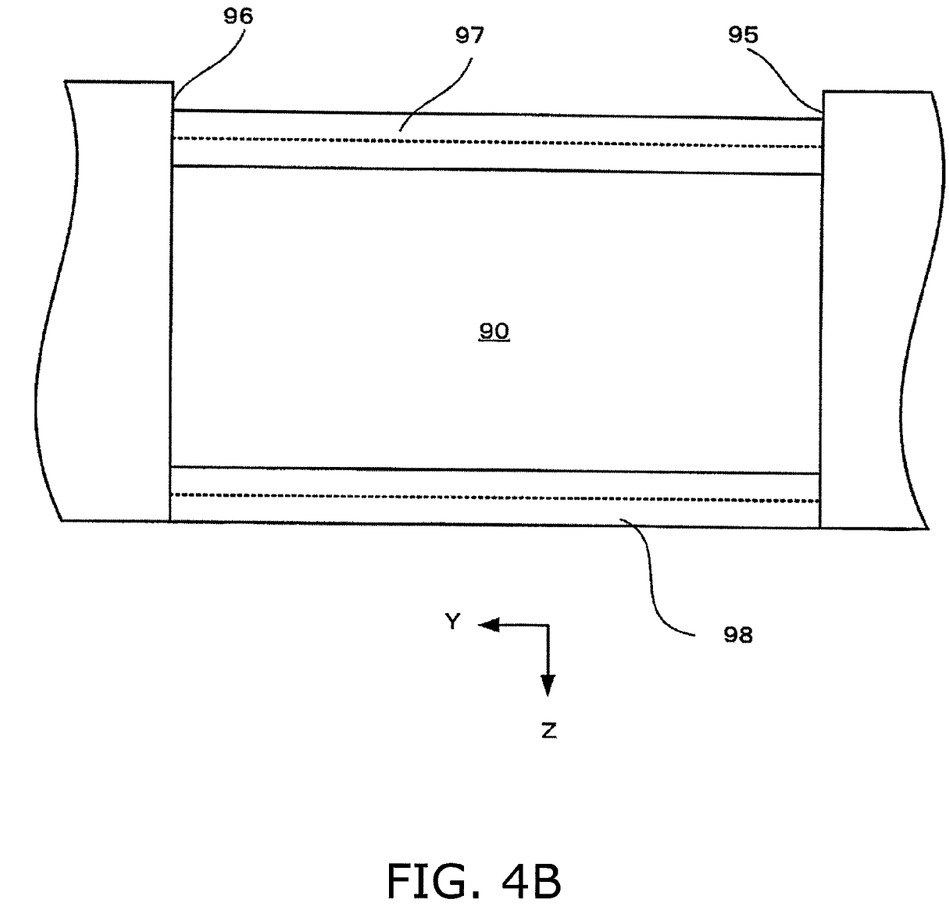

FIG. 4 is a figure showing the structure of a portion of the internal construction of a table according to a variant embodiment of the present invention. FIG. 4(A) is a sectional view taken in an X-Y plane showing the way in which a exhaust chamber side wall 90 is installed, and FIG. 4(B) is a figure showing this way in which the exhaust chamber side wall 90 is installed, as seen from the direction of the X axis.

As shown in FIG. 4(A), in the table 12 according to this variant embodiment, a guide portion 98 which fixes the bottom edge of the exhaust chamber side wall 90 is provided on the lower surface of the table 12. As shown in FIG. 4(B), this guide portion 98 has a length which spans between the front wall 95 and the rear wall 96 and is connected to the front wall 95 and the rear wall 96, and consists of a beam which is incorporated in the table 12. Due to this, it is possible to enhance the rigidity of the table 12, and it is possible to maintain the table 12 in an appropriate shape. In the upper portion of this guide portion 98 there is formed a concave shaped portion 98a, into which the bottom edge of the exhaust chamber side wall 90 can be inserted from above.

Furthermore, in this table 12, above the upper edge of the exhaust chamber side wall 90, there is provided a shield unit 97 which is formed from a heat resistant material, so as to cover over the upper edge portion of the exhaust chamber side wall 90. As shown in FIG. 4(B), this shield unit 97 has a length which spans between the front wall 95 and the rear wall 96 and is connected to the front wall 95 and the rear wall 96, and consists of a beam which is incorporated in the table 12. Due to this shield unit 97, it is possible to enhance the rigidity of the table 12, and it is possible to maintain the table 12 in an appropriate shape; and, moreover, it is possible appropriately to prevent flame and spatter due to the cutting head 38, and metal which has been melted by the cutting head 38 (i.e. broken pieces from the board 15), from contacting the exhaust chamber side wall 90.

Next, a description is given of a modified example of a thermal cutter 10 of an embodiment of the present invention.

Figure 5:
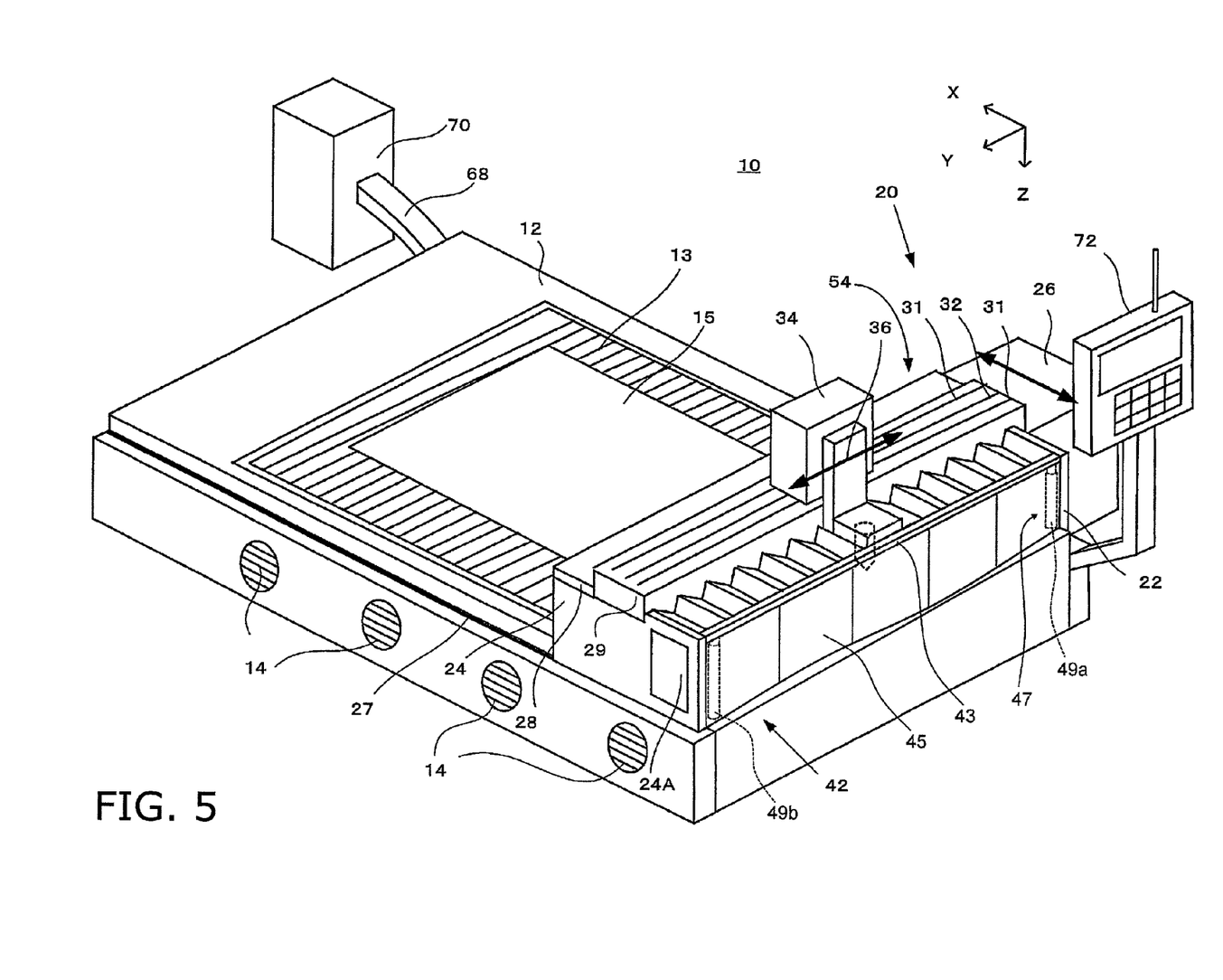
FIG. 5 is a perspective view showing an overall configuration for a thermal cutter of a modified example of the embodiment of the present invention.

FIG. 5 is a perspective view showing an overall configuration for the thermal cutter 10 of a modified example of the embodiment of the present invention. At this thermal cutter 10, a front cover unit 42 (side cover unit) is provided so as to enable a space within to be opened up and closed. Specifically, the front cover unit 42 includes a support member 43 and a curtain-shaped member 45. The support member 43 is provided along the Y-direction and supports the curtain-shaped member 45. The curtain-shaped member 45 hangs from the support member 43 and covers the space where the cutting head 38 is arranged from the front. The curtain-shaped member 45 is formed from fire-resistant cloth, etc.

Figure 6:
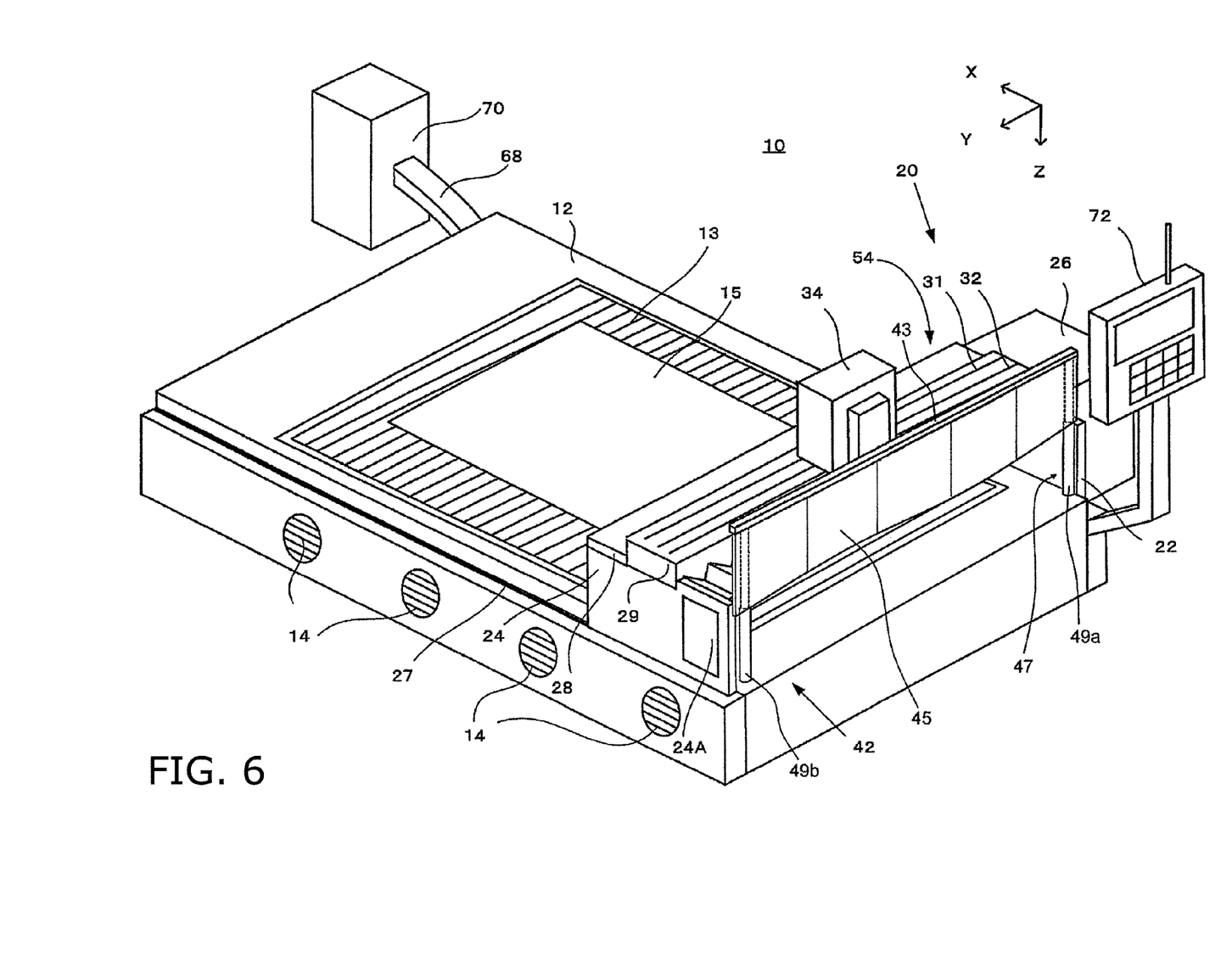
FIG. 6 is a perspective view showing an overall configuration for a thermal cutter of a modified example of the embodiment of the present invention.

The thermal cutter 10 includes a drive mechanism for opening and closing the front cover unit 42. The drive mechanism includes a pair of air cylinders 49a, 49b and a pair of guide members (not shown). The pair of air cylinders 49a, 49b are arranged spaced from each other in the Y-axis direction and are arranged in the vicinity of both side ends of the front cover unit 42. A support member 43 is fitted to the upper ends of the air cylinders 49a, 49b and the front cover unit 42 moves vertically as a result of the air cylinders 49a, 49b expanding and contracting. In FIG. 5, the front cover unit 42 closes the internal space when the air cylinders 49a, 49b are retracted. Further, in FIG. 6, the front cover unit 42 opens up the internal space as a result of moving upwards from the position of FIG. 5 when the air cylinders 49a, 49b are elongated.

At the thermal cutter 10, the controller 72 controls the opening and closing operation of the front cover unit 42 by controlling the operation of the air cylinders 49a, 49b. Specifically, the controller 72 closes the front cover unit 42 while the cutting head 38 is performing thermal cutting. Namely, heat is generated by the cutting head 38, and the front cover unit 42 is closed in a state where cutting sound and fumes are generated. As a result, it is possible to suppress the influence of cutting sounds and smoke on the surrounding users. Further, the controller 72 opens the front cover unit 42 while the cutting head 38 is stopping thermal cutting. For example, the front cover unit 42 is opened when the moving of the cutting head 38 is halted and the cutting head 38 is not emitting heat, or when the cutting head is being transported and is not emitting heat. The user can therefore easily confirm conditions within the thermal cutter 10.

The curtain-shaped member 45 can also be made of other material such as vinyl. Further, the curtain-shaped member 45 can be formed from a metallic or resin plate, etc.

Figure 7:
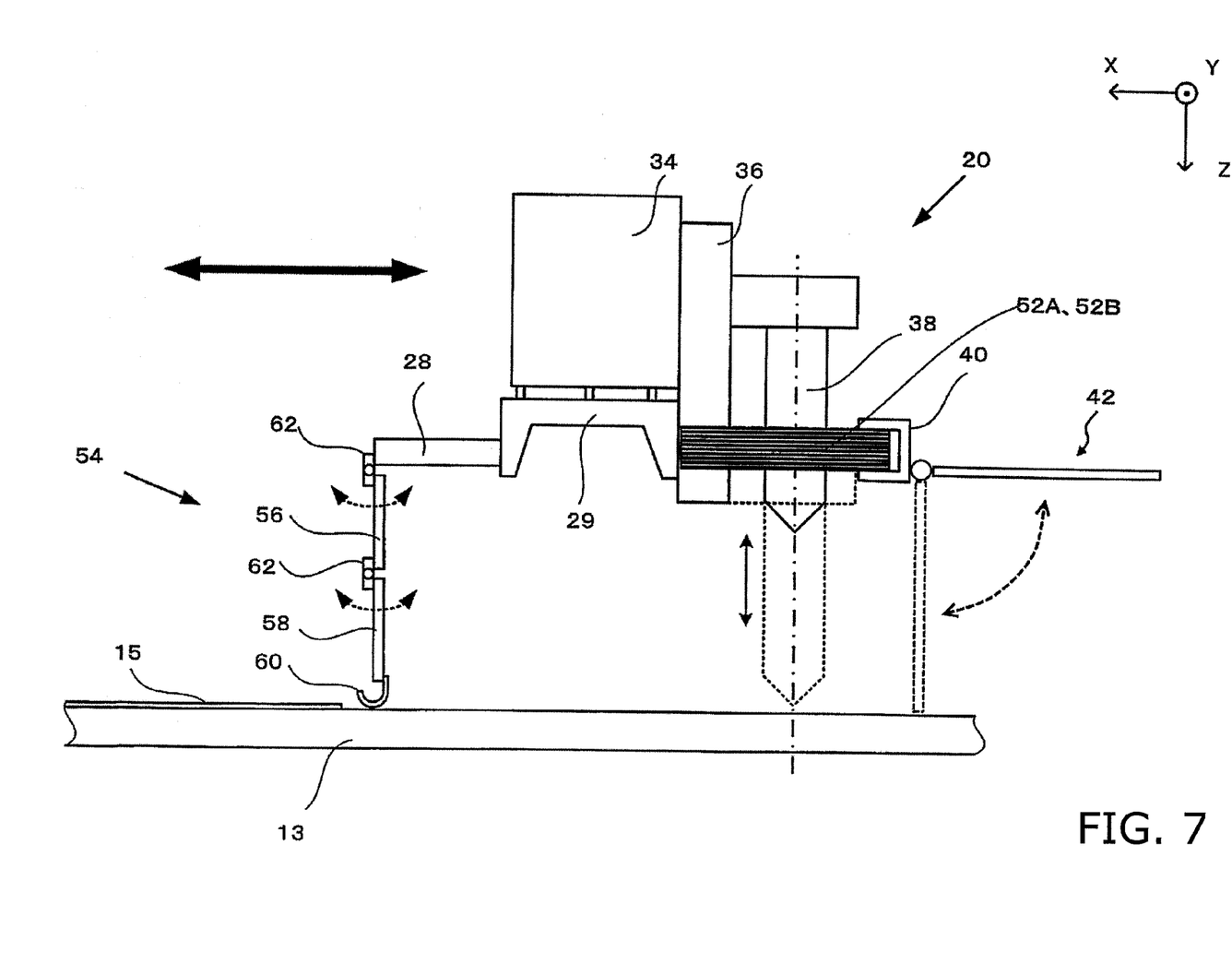
FIG. 7 is a cross-section of a thermal cutter of a modified example of the embodiment of the present invention.

It is also possible to use other actuators other than the air cylinders 49a, 49b. Further, the front cover unit 42 can also be opened and closed in other ways. For example, as shown in FIG. 7, the front cover unit 42 can be opened and closed as a result of turning.

Further, the rear cover unit 54 can be opened and closed. It is also preferable for the front cover unit 42 close to the cutting head 38 to be opened and closed from the point of view of understanding the conditions of the content.

Further, it is also possible for the front cover unit 42 to open and close in response to the operation of a button of the controller 72 by the user.

Although the present invention has been explained above in terms of one embodiment thereof, this embodiment is not to be considered as being limitative of the present invention, which can be implemented in various other manners.

For example although, in the embodiment described above, the entirety of each of the exhaust chamber side walls 90 was made from a sound absorbent material, this is not to be considered as being limitative of the present invention; it would also be acceptable, for example, for one or more of them to consist of a plate member to which a layer of sound absorbent material is affixed. For this sound absorbent material, for example, a porous cast metallic material, glass wool, or steel wool would be acceptable. In this case, it would be acceptable to make it possible for both the plate shaped member and the sound absorbent material to be fitted to and removed from the table 12 together, or, alternatively, it would also be acceptable to make it possible for the sound absorbent material to be fitted to and removed from the plate member, while the plate member remains fixed to the table 12 just as it is. Moreover, it would be acceptable to arrange for the sound absorbent material to be fitted all over the plate member (the side wall), or to be fitted over only a portion thereof.

Furthermore although, in the embodiment described above, each of the front surface cover unit 42 and the rear surface cover unit 54 was made to be of a length such that it was capable of contacting the surface of the board 15, this is not to be considered as being limitative of the present invention; it would also be acceptable for them to be made to be of a length which reaches the neighborhood of the surface of the board 15. In this case as well, in a similar manner to that described above, it would be possible to obtain the advantageous effect of prevention of noise, and the advantageous effect of prevention of leakage of fumes to the exterior.

Even further although, in the embodiment described above, each of the front surface cover unit 42 and the rear surface cover unit 54 was made as a combination of a plurality of comparatively hard members, this is not to be considered as being limitative of the present invention; for example, it would also be possible to make either or both of these members as a flexible non-flammable fabric type material, the important aspect being that it should be capable of flexing along the X axis.

Still further although, in the embodiment described above, all of the front surface cover unit 42, the rear surface cover unit 54, and the upper surface cover unit 40 were provided, this is not to be considered as being limitative of the present invention; it would also be acceptable, for example, not to provide the front surface cover unit 42, so that the rear surface cover unit 54 was provided as being separated from the cutting head 38 in the X axis direction. Moreover, it would also be acceptable to arrange to provide the front surface cover unit 42 and the rear surface cover unit 40, but not to provide the upper surface cover unit 40. By doing this, as well, it would also be possible to prevent escape of sound in a predetermined direction, and appropriately to prevent the leakage of fumes to the exterior. Furthermore, no influence at all would be exerted upon the shifting operation of the cutting head 38 itself, and no effective obstacle would be interposed to work upon the cutting head 38, or to the tasks of checking the cutting by the cutting head 38 and the like.

The embodiments illustrated above have the effects of reducing noise and being easy to maintain and is therefore useful as a thermal cutter.

What is claimed is:

1. A thermal cutter for cutting a board with heat, the thermal cutter comprising:
   a table on which the board is mounted;
   a cutting head configured and arranged to cut the board;
   a first axis shift unit movably supporting the cutting head to shift along a first axial direction parallel to a mounting surface of the table on which the board is mounted;
   a second axis shift unit movably supporting the first axis shift unit to shift with respect to the table along a second axial direction orthogonal to the first axial direction and parallel to the mounting surface;
   a cover unit coupled to the second axis shift unit and moveable together with the second axis shift unit in the second axial direction, the cover unit including a front cover portion and a rear cover portion, the cover unit at least partially defining a shiftable space within which the cutting head is disposed during cutting, the shiftable space extending approximately over an entire shiftable range of the cutting head in the first axial direction, the front cover portion of the cover unit including a first cover plate and a second cover plate, the second cover plate being disposed below the first cover plate and pivotally connected to the first cover plate via a hinge;
   a plurality of walls disposed in an internal space of the table to partition the internal space into a plurality of exhaust chambers with each of the exhaust chambers having an aperture that opens towards a side on which the board is mounted;
   a sound absorbent material provided to at least a portion of at least one of the walls, the sound absorbent material being removably coupled to the table; and
   an air flow creating section configured and arranged to create an air flow within the exhaust chambers;
   the walls including a front wall having an exhaust aperture and a side wall extending in a direction approximately orthogonal to the front wall with the air flow creating section being configured and arranged to create the air flow in a direction approximately parallel to the side wall towards the front wall, and
   the sound absorbent material being provided at least to the side wall.

2. The thermal cutter according to claim 1, wherein
   at least one of the walls is made from the sound absorbent material in its entirety.

3. The thermal cutter according to claim 1, wherein
   the sound absorbent material includes a non-flammable or heat resistant material.

4. The thermal cutter according to claim 1, wherein
   the cutting head is configured and arranged to generate heat in the board,
   the sound absorbent material is provided in an area in which a heat releasing medium from the cutting head does not directly come into contact with the sound absorbent material.

5. The thermal cutter according to claim 1, wherein
   the cutting head is configured and arranged to generate heat in the board, and
   a shield unit is provided to shield the sound absorbent material so that a heat releasing medium from the cutting head does not directly come into contact with the sound absorbent material.

6. The thermal cutter according to claim 1, wherein,
   the cover unit further includes an upper cover portion that covers over the space extending approximately over the entire shiftable range of the cutting head during cutting along the first axial direction from above.

7. The thermal cutter according to claim 1, wherein
   the exhaust chambers are arranged along the second axial direction, and a length in the first axial direction of the cover unit is greater than or equal to a length of the exhaust chambers in the first axial direction.

8. The thermal cutter according to claim 7, wherein
   the cover unit is dimensioned to cover over approximately an entire upper portion of at least one of the exhaust chambers.

9. The thermal cutter according to claim 6, wherein
   the cutting head is inserted into the space through the upper cover portion,
   the upper cover portion includes the first upper cover portion covering over from above a first portion of the space disposed on one side of the cutting head along the first axial direction, and the second upper cover portion covering over from above a second portion of the space disposed on the other side of the cutting head along the first axial direction, and the first upper cover portion and the second upper cover portion are configured and arranged to expand and contract as the cutting head shifts along the first axial direction.

10. The thermal cutter according to claim 6, wherein the second axis shift unit includes an arm portion extending along the first axial direction, the front cover portion and the rear cover portion have lower edges disposed adjacent to or contacting a surface of the board when the board is mounted on the mounting surface, and each of the front cover portion and the rear cover portion is suspended from the arm portion to swingably move in the second axial direction with respect to the arm portion with each of the front cover portion and the rear cover portion being configured and arranged to flex in the second axial direction.

11. A thermal cutter for cutting a board with heat, the thermal cutter comprising:

a table on which the board is mounted;

a cutting head configured and arranged to cut the board;

a first axis shift unit moveably supporting the cutting head to shift along a first axial direction parallel to a mounting surface of the table on which the board is mounted;

a second axis shift unit moveably supporting the first axis shift unit to shift with respect to the table along a second axial direction orthogonal to the first axial direction and parallel to the mounting surface;

a cover unit coupled to the second axis shift unit and moveable together with the second axis shift unit in the second axial direction, the cover unit including a front cover portion and a rear cover portion, the cover unit at least partially defining a shiftable space within which the cutting head is disposed during cutting, the shiftable space extending approximately over an entire shiftable range of the cutting head in the first axial direction, the front cover portion of the cover unit including a support member, a curtain-shaped member hanging from the support member, and a drive mechanism configured to vertically move the support member;

a plurality of walls disposed in an internal space of the table to partition the internal space into a plurality of exhaust chambers with each of the exhaust chambers having an aperture that opens towards a side on which the board is mounted;

a sound absorbent material provided to at least a portion of at least one of the walls, the sound absorbent material being removably coupled to the table; and an air flow creating section configured and arranged to create an air flow within the exhaust chambers;

the walls including a front wall having an exhaust aperture and a side wall extending in a direction approximately orthogonal to the front wall with the air flow creating section being configured and arranged to create the air flow in a direction approximately parallel to the side wall towards the front wall, and the sound absorbent material being provided at least to the side wall.

12. The thermal cutter according to claim 11, wherein the cover unit further includes an upper cover portion that covers the space from above.

13. The thermal cutter according to claim 12, wherein the first axis shift unit is arranged outside of the cover unit.

14. The thermal cutter according to claim 1, wherein the second axis shift unit has an arm extending along the first axial direction with the arm shiftably supporting the first axis shift unit along the arm, the cutting head is positioned on a predetermined side in the second axial direction with respect to the arm.

15. The thermal cutter according to claim 1, wherein the first cover plate includes a transparent window unit.

16. The thermal cutter according to claim 1, wherein the second cover plate includes a transparent window unit.

17. The thermal cutter according to claim 1, wherein the front cover portion further includes a lower edge plate portion connected to a lower edge of the second cover plate, the lower edge plate portion having a curved surface.

18. The thermal cutter according to claim 11, further comprising a controller configured to control the drive mechanism to control opening and closing operation of the front cover portion.

19. The thermal cutter according to claim 18, wherein the controller is configured to control the drive mechanism to maintain the front cover portion in a closed state during execution of thermal cutting by the cutting head.

20. The thermal cutter according to claim 18, wherein the controller is configured to control the drive mechanism according to operation of a button of the controller by a user.

* * * * *